United States Patent [19]
Schatz

[11] Patent Number: 5,222,298
[45] Date of Patent: Jun. 29, 1993

[54] METHOD OF PRODUCING A HEAT STORAGE MEANS

[76] Inventor: Oskar Schatz, Waldpromenade 16, D-W-8035 Gauting, Fed. Rep. of Germany

[21] Appl. No.: 722,924

[22] Filed: Jun. 28, 1991

[30] Foreign Application Priority Data

Jun. 29, 1990 [DE] Fed. Rep. of Germany ....... 4020860

[51] Int. Cl.⁵ .................. B23P 15/26; F28D 20/00
[52] U.S. Cl. ...................... 29/890.03; 29/890.032; 165/10
[58] Field of Search ......... 165/10; 29/890.03, 890.032

[56] References Cited

U.S. PATENT DOCUMENTS

| | | | |
|---|---|---|---|
| 3,062,510 | 11/1962 | Percival | 165/10 |
| 3,825,059 | 7/1974 | Laing | 165/10 |
| 4,932,465 | 6/1990 | Schatz | 165/10 |
| 4,977,952 | 12/1990 | Schatz | 165/10 |

FOREIGN PATENT DOCUMENTS

| | | | |
|---|---|---|---|
| 3819223 | 12/1988 | Fed. Rep. of Germany | 165/10 |
| 35292 | 2/1982 | Japan | 165/10 |

Primary Examiner—Albert W. Davis, Jr.
Attorney, Agent, or Firm—Harness, Dickey & Pierce

[57] ABSTRACT

In a method for the production of a heat storage means, more particularly in the form of a latent heat storage means, for vehicle heating systems run on heat from the engine, comprising a housing, which is made up of an outer container and an inner container arranged in spaced relationship to the outer container so as to constitute an insulating vessel including an insulating zone, a heat storage core arranged in the inner container and having at least one chamber for a heat storage medium in it, said chamber being separated by a partition wall from at least one flow path for a heat transfer medium, and an inlet duct and outlet duct for the heat transfer medium, such ducts being connected with the flow path and extending outwards through the insulating zone, the insulating zone having been baked out in the housing for degassing and having been evacuated. In the range between the filling temperature of the storage when being being charged into the storage zone, and the maximum temperature occurring thereafter the volume of the storage medium changes with temperature to a greater extent than the respective chamber volume. There the amount of the filling charge of the storage medium is made such that at the maximum temperature occurring the volume of the storage medium is at the most equal to the associated chamber volume.

1 Claim, 2 Drawing Sheets

METHOD OF PRODUCING A HEAT STORAGE MEANS

BACKGROUND OF THE INVENTION

The invention relates to a method for the production of a heat storage means, more particularly in the form of a latent heat storage means, for vehicle heating systems run on heat from the engine, comprising a housing, which is made up of an outer container and an inner container arranged in spaced relationship to the outer container so as to constitute an insulating vessel including an insulating zone, a heat storage core arranged in the inner container and having at least one chamber for a heat storage medium in it, said chamber being separated by a partition wall from at least one flow path for a heat transfer medium, and an inlet duct and outlet duct for the heat transfer medium, such ducts being connected with the flow path and extending outwards through the insulating zone, the insulating zone having been baked out in the housing for degassing and having been evacuated, and between the filling temperature of the storage when being being charged into the storage zone, and the maximum temperature occurring thereafter the volume of the storage medium changes with temperature to a greater extent than the respective chamber volume.

During the production and the operation of a heat storage means temperature thresholds have to be adhered to, which are dependent on the selection of the material employed. In this respect it may sometimes be a question of the materials used for the components; more particularly however such temperature thresholds are set with respect to the heat storage medium. For instance, the heat storage medium may be comparatively sensitive to thermal effects and be inclined to degrade when a threshold is exceeded. However furthermore the action on the heat storage means, more particularly under the influence of vapor pressure and thermal expansion, is significant.

These problems are more particularly explain taking a latent heat storage means as an example. In the case of heat storage means a heat storage medium is employed, which in the charged state of the heat storage means is liquid and below a so-called transition temperature in the discharged condition of the heat storage means is solid. The operational temperature of the heat storage means is predetermined by the temperature of the heat transfer medium utilized for charging the heat storage means and hence for the field of use of the heat storage means. If in the case of motor vehicles the cooling water is utilized as the heat transfer medium, the operational temperature of the heat storage means will generally be at 90° C., a maximum temperature of 125° C. having to be taken into account. If $Ba(OH)_2 \cdot 8H_2O$ is employed as the heat storage medium, whose boiling amounts to 110° C., then at the maximum operational temperature a vapor pressure of regenerator 1.5 bar is to be expected. When filling the heat storage zone with the heat storage medium the temperature thereof should be somewhat under the fusion point in order to ensure the simplest possible handling in the liquid condition. There is thus a temperature difference between the filling temperature and the maximum operating temperature, this being likely to be the cause of substantial thermal expansion of the storage medium, which in addition to the vapor pressure leads to a mechanical loading of the storage core.

A further temperature which has to be taken into account is the bake out temperature occurring during the manufacture of the heat storage means. After the mechanical manufacture of such a storage housing the desired insulating effect is able to be achieved in a matter of minutes by evacuation of the insulating zone. However, this insulating action is not permanent, since materials, which may evaporate in the course of time and thus increase the pressure in the insulating zone and therefore degrade the insulating effect of the vacuum, are absorbed on the surfaces of the outer and of the inner container adjacent to the insulating zone, on the surfaces of any radiation shields located in the insulating zone, or on microporous insulating materials, and also on the obligatory internal structures in the insulating zone, that is to say the supply and removal ducts and the means for mounting the inner container.

For this reason after mechanical processing during manufacture vacuum insulated vessels are degassed for a prolonged time, the insulating zone being continuously exhausted by a pump. In order to reduce the time required for degassing to an economic level, as for example to 24 hours, the insulating vessel is heated to an elevated temperature during degassing, this being termed bake out. It is to be seen form experience that an increase in temperature of 10° C. halves the degassing time.

It is furthermore known that a major contaminant of vacuum vessels is water deposited on the walls. For the removal of such water there are three pronounced temperature stages, that is to say approximately 120° C. with low evaporation rates, 180° C. with very high evaporation rates and approximately 360° C. with an evaporation which is practically increased one hundredfold.

It is also known that during degassing the long-term effect depends on the lowest temperature, which is reached at the surfaces in the insulating zone. It follows from this that for a certain long-term effect all surfaces defining the insulating space have to reach or exceed the minimum temperature.

For large-scale use in automobile engineering a long-term effect of the vacuum is necessary, which calls for bake out at the second temperature level of about 180° C., a value which is above the boiling point of most heat storage media so that the bake out temperature has to be substantially above the maximum operational temperature, for which reason—if the storage medium is exposed to this temperature—the storage core would be exposed to the effects of a vapor pressure which is still further increased and to a thermal expansion which is also increased.

The vapor pressure occurring at the maximum temperatures reached may be coped with by suitable dimensioning and design of the heat storage means components exposed to this vapor pressure.

SHORT SUMMARY OF THE PRESENT INVENTION

Accordingly one object of the present invention is to provide such a further development of the above mentioned method that on the one hand the undesired effect of thermal expansion on the heat storage means is avoided.

A further object of the invention is to render the filling of the heat storage means with the heat storage medium relatively simple that is to say only a low temperature and at atmospheric pressure.

Furthermore, the method is to be such that the temperature of the heat storage medium is able to exceed the boiling point during the following production stages and during operation.

In order to achieve these or other objects appearing from the present specification, the claim and drawings, the filling charge of storage medium is of such an amount that at the maximum temperature occurring the volume of the storage medium is at the most equal to the chamber volume provided therefor.

Thus the storage zone is not completely filled with the storage medium and it is rather a question of the permissible amount of filling charge being computed on the basis of the intended filling temperature and the maximum temperature to be taken into account and of only this amount of filling charge being used so that it is not possible for any mechanical loading of the chamber walls to be caused by the thermal expansion of the filling charge material. As a result there is also the possibility of exceeding the boiling point of the heat storage medium during operation and during production of the heat storage means.

A better apprehension of the invention will be gathered from the ensuing description of several embodiments of a latent heat storage means referring to the drawings.

LIST OF THE SEVERAL VIEWS OF THE DRAWINGS

DETAILED DESCRIPTION OF WORKING EMBODIMENTS OF THE INVENTION

Figure 1:
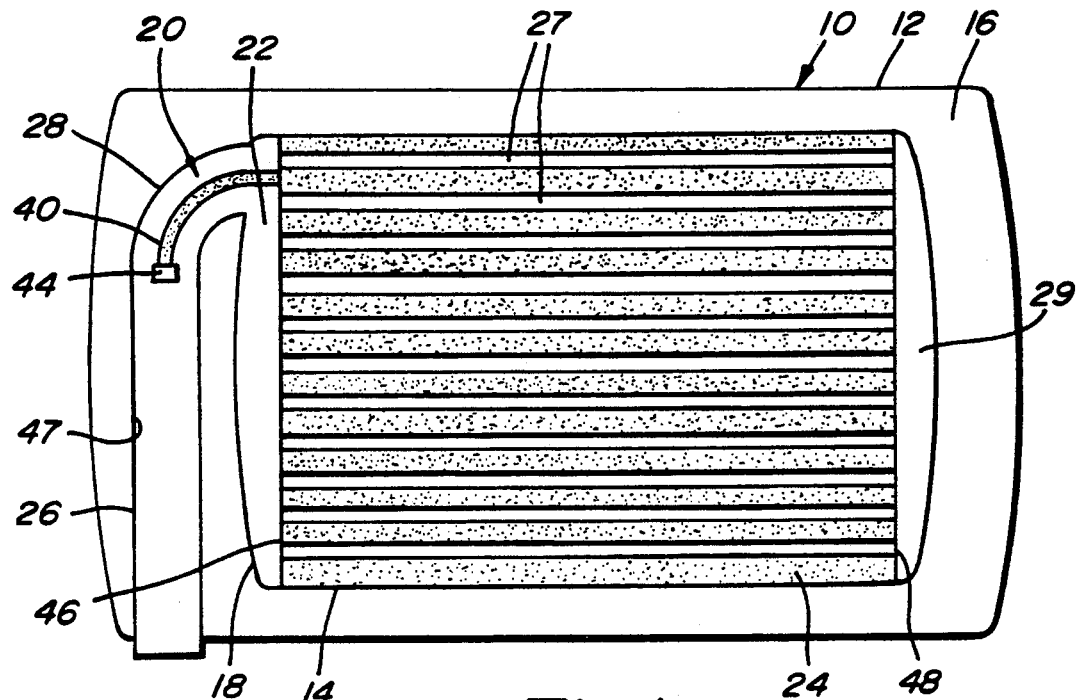
FIG. 1 is a section taken through a heat storage means which in the inner container has a single chamber, through which flow ducts for the heat vehicle extend, for the storage medium.

In FIG. 1 the housing, which is of metallic construction, of a latent heat storage means is generally referenced 10. This housing 10 consists of a cylindrical outer container 12 and an inner container 14, which is coaxially arranged to the first container and is also cylindrical, the inner container 14 having a suitable mounting means or support, not illustrated here, holding it in relation to the outer container 12 so that there is a clearance between the outer container 12 and the inner container, such clearance forming an insulating space 16.

At its end side the inner container 14 is provided with a supply duct 20 and a removal duct for a heat vehicle medium, such removal duct being parallel to the duct 20 and thus not being visible in the figure. These ducts open into a chamber 22 in the inner container, which is divided by a vertical separating partition, running parallel to the plane of the drawing, into a section associated with the supply duct 20 and a section associated with the return duct. Furthermore a chamber 24 for a heat storing medium, as for instance one in the form of a salt mixture or salt solution, is arranged in the inner container 14. Flow channels 27 for a heat vehicle extend between two end walls 46 and 48 delimiting the chamber 24, the space 29 adjacent to the end wall 48 serving as a direction changing chamber for the heat vehicle, which initially flows through the supply duct 20 and is separated by the above-mentioned vertical separating wall in front of the end wall 46 form the heat vehicle which has already flowed through the direction changing chamber 29 and is flowing towards the return duct.

A high vacuum is preferably produced in the insulating space 16. In order to maintain this vacuum as long as possible the surfaces of the heat storage means housing 10 defining the insulating space 16 are degassed in a conventional manner by heating at around 400° C.

In order to keep the thermal losses as low as possible the mounting means or, respectively, the supporting means of the inner container 14 in the outer container are so made that thermal bridges are substantially avoided. Furthermore, the supply duct 20 and the removal duct, related to the setting of the installed heat storage means are so connected that they have a section 26, which extends downwards through the insulating space 16 for a maximum vertical length that is to say to a point at which it then extends outwards through the outer container 12. In the illustrated embodiments the supply duct 20 and the removal duct start at the inner container with a bend 28 merging into the vertical section 26. In the vertical section 26 of the supply duct 20 and the return duct it is possible for a barrier layer to become established between the hot heat transporting medium within the inner container 14 and the part, which cools down after interruption of the supply of heat, of the heat vehicle medium outside the heat storage means so that the insulating effect is even further ameliorated.

The chamber 24 is connected with a filling channel 40 of the storage medium, which channel extends within the supply duct 20 with a clearance between it and the wall 47 thereof and ends behind the bend 28 in the initial part of the straight section 26, where the filling channel 40 is able to be shut off by a plug 44, which may be introduced through the straight section of the supply duct 20. The filling channel 40 is thus always in the zone occupied by the hot part of the heat vehicle medium, this being a particularly effective way of preventing thermal losses.

Figure 2:
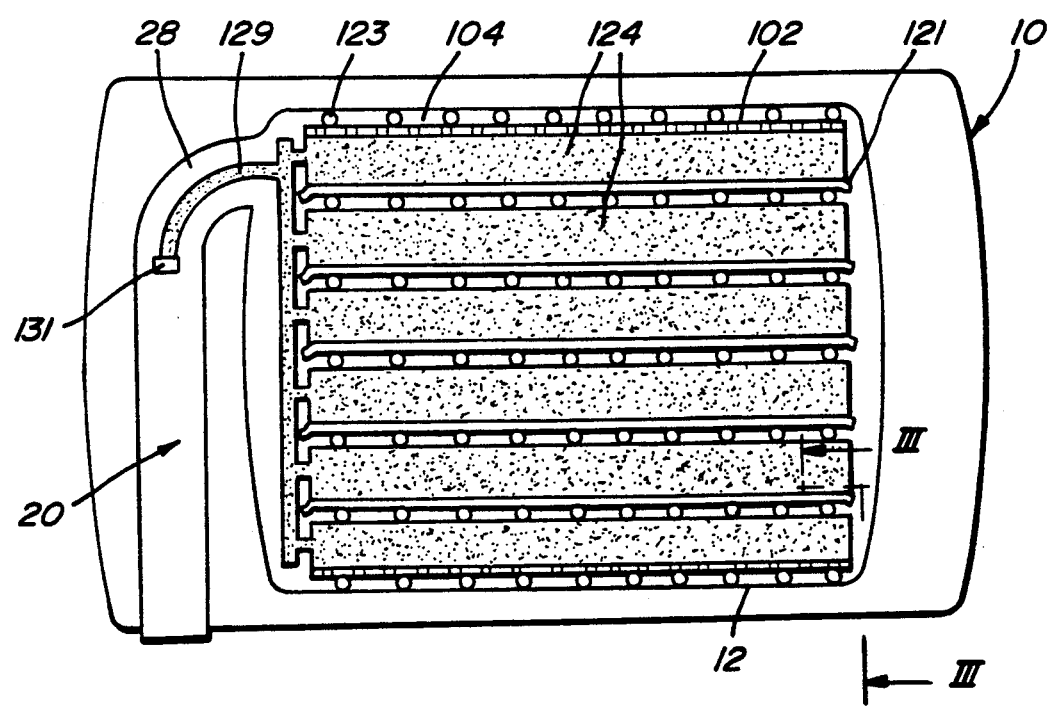
FIG. 2 shows a section corresponding to the FIG. 1 taken through a heat storage means, which in the inner container has separate chambers, divided off from the flow zone of the heat vehicle, for the storage medium.
Figure 3:
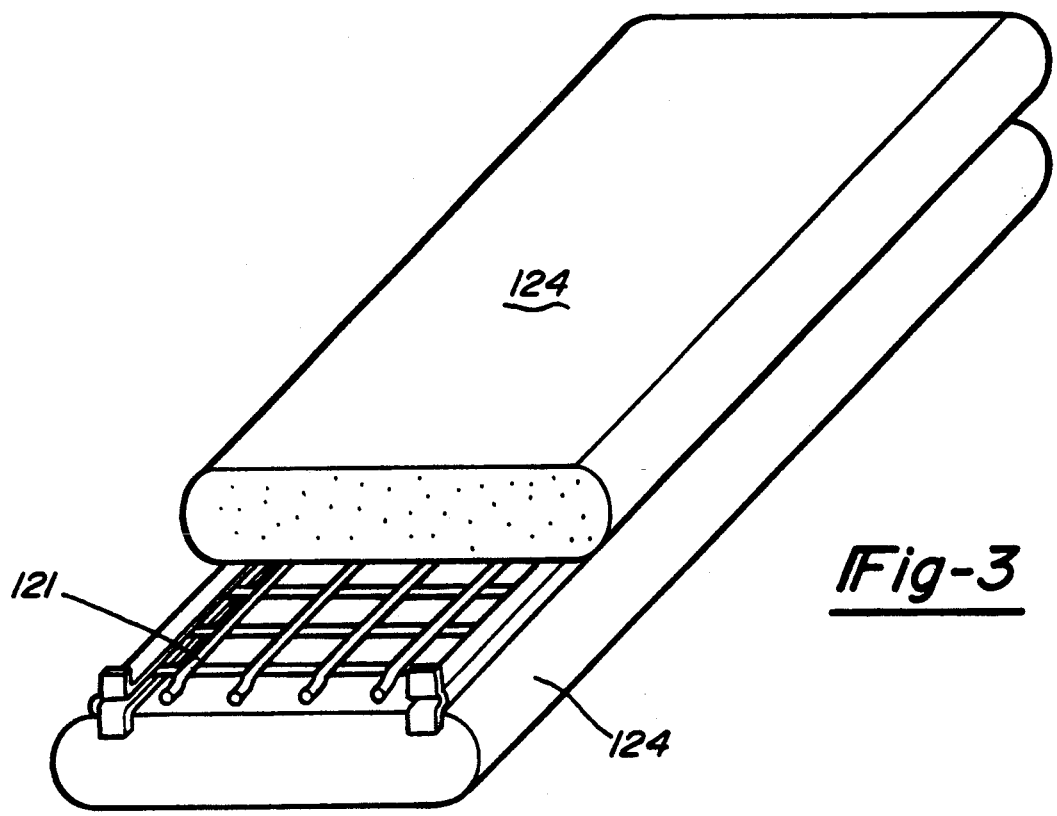
FIG. 3 is a section taken on the line III—III through the heat storage means in accordance with FIG. 2.

Another embodiment of a heat storage means is shown in FIGS. 2 and 3, in which parts corresponding to the parts in FIG. 1 are denoted by like references.

The most significant difference is to be seen in the fact that in place of a single chamber for the storage medium there is a stack of individual chamber elements 124 separated from each other by flexible casings, the individual chamber elements 124 being spaced apart by means of distance pieces 121 so that there is at all times a sufficient flow cross section for the heat vehicle between the chamber elements 124. More particularly at times when the heating effect or possibly a cooling effect limiting the temperature takes place during bake out owing to the flow paths for the heat vehicle, it is necessary to ensure that there is a sufficient flow cross section even with the increase in volume, dependent on the bake out temperature, of the storage medium.

The distance pieces 121, which simultaneously serve as turbulence producing means for improving the transfer of heat, may for instance be in the form of wire gauze elements, as shown in FIG. 3.

The stack of chamber elements 124 separated by the distance pieces 121 is enveloped in a wire casing 102 and is inserted into the inner container 14 with the formation of an insulating gap 104 formed by the distances pieces 123 arranged between the wire casing 102 and the wall of the inner container 14.

All the chamber elements 124 are provided with a common filling duct 129, which extends in the manner already described through the bend 28 of the supply duct 20 and which comes to an end at the inlet end of the section 26 of the supply duct 20 running vertically downwards and is shut off by a closure cap 131 at this point.

It is to be noted in addition that in the case of the embodiment of FIGS. 2 and 3 as well the chamber elements 124 may be made of rigid material or it is possible for each chamber element 124 to be separately filled, for instance prior to the installation thereof.

In the case of a rigid chamber 24 or in the case of rigid chamber elements 124 the maximum chamber volume available for the storage medium may be derived from the dimensions of the chambers. If chamber elements 124 with flexible walls are used, the maximum expansion of the walls of the chamber elements 124 as limited by the distance pieces 121 and 123 at the maximum temperature occurring and the increase in volume due thereto, may be taken into account in choosing the amount of filling charge of storage medium. The amount of filling charge is ascertained on the basis of the maximum expected temperature, of the chamber volume which is available owing to the structural features of the heat storage means and of the increment in volume of the storage medium due to the rise in temperature from the filling temperature to the supposed maximum temperature so that simple filling of the chamber or, respectively, of the chamber elements is made possible and at the same time the danger of damaging effects of thermal expansion of the heat storage medium on the structure of the heat storage means is avoided.

I claim:

1. In a method for the production of a heat storage means, for vehicle heating systems run on heat from an engine, comprising: providing a housing having an outer container and an inner container arranged in a spaced relationship to the outer container so as to constitute an insulating vessel including an insulating zone between said inner and outer containers; providing a heat storage core arranged in the inner container and having at least one chamber for a heat storage medium, said chamber being separated by a partition wall from at least one flow path for a heat transfer medium, providing an inlet duct and outlet duct for the heat transfer medium, said ducts being connected with the flow path and extending outward through the insulating zone, filling the inner container chamber with a heat storage medium at a temperature substantially below the maximum temperature and the volume of the heat storage medium being less than the volume of the chamber, degassing and evacuating the insulating zone in the housing at a desired bake out temperature after filling, said bake out temperature being between the filling temperature of the storage medium being charged into the storage zone and the maximum temperature, charging an amount of heat storage medium such that at the maximum temperature the volume of the storage medium is substantially equal to the associated chamber volume.

* * * * *